(12) United States Patent
Carlson (10) Patent No.: US 8,231,152 B2
(45) Date of Patent: Jul. 31, 2012

(54) HATCH LATCH

(76) Inventor: Kerry A Carlson, Bellingham, WA (US)

( * ) Notice: Subject to any disclaimer, the term of this patent is extended or adjusted under 35 U.S.C. 154(b) by 135 days.

(21) Appl. No.: 12/872,300

(22) Filed: Aug. 31, 2010

(65) Prior Publication Data

US 2012/0049542 A1    Mar. 1, 2012

(51) Int. Cl.
*E05C 17/04*    (2006.01)
*E05C 17/54*    (2006.01)
*A44B 13/00*    (2006.01)
*F16B 45/04*    (2006.01)

(52) U.S. Cl. ............... 292/262; 292/DIG. 14; 292/339; 24/599.6

(58) Field of Classification Search ........... 292/1, 251.5, 292/262, 271, 275, 278, 281, 285, 288, 297, 292/DIG. 42, 339; 296/76; 248/229, 13, 248/229.23, 228.4, 230.3, 231.51, 316.5; 24/376; 16/82

See application file for complete search history.

(56) References Cited

U.S. PATENT DOCUMENTS

| | | | | |
|---|---|---|---|---|
| 1,584,307 A * | 5/1926 | King | ................ | 24/577.1 |
| 1,680,551 A * | 8/1928 | King | ................ | 24/577.1 |
| 2,128,804 A * | 8/1938 | Donaldson | ........ | 24/376 |
| 2,618,497 A * | 11/1952 | Gardels | ............ | 292/265 |
| 2,795,024 A * | 6/1957 | Donaldson | ........ | 24/376 |
| 3,002,242 A * | 10/1961 | Donaldson | ........ | 24/376 |
| 4,157,844 A * | 6/1979 | Sarosy et al. | ...... | 292/48 |
| 4,278,280 A * | 7/1981 | Rashbaum | ........ | 292/263 |
| 4,607,548 A * | 8/1986 | Anderson | ........ | 81/427 |
| 4,667,993 A * | 5/1987 | Hannesson et al. | ... | 292/339 |
| 4,870,925 A * | 10/1989 | Troutman | ........ | 119/453 |
| 5,165,742 A * | 11/1992 | Frayne | ............ | 292/262 |
| 5,551,738 A * | 9/1996 | Thorlton | ........ | 292/262 |
| 6,048,005 A * | 4/2000 | Rotondi | ........ | 292/262 |
| 6,368,007 B1* | 4/2002 | Harvey | ........ | 403/260 |
| 6,540,271 B1* | 4/2003 | Kalsi | ............ | 292/216 |
| 2005/0097758 A1* | 5/2005 | Elkins | ........ | 30/233 |
| 2006/0060261 A1* | 3/2006 | Awad | ............ | 141/351 |
| 2009/0102204 A1* | 4/2009 | Hilliard | ........ | 292/139 |

* cited by examiner

*Primary Examiner* — Thomas Beach
*Assistant Examiner* — Faria Ahmad
(74) *Attorney, Agent, or Firm* — K Karel Lambert; Lambert Patent Services LLC (57) ABSTRACT

A latch extension device for lockedly securing a hinged hatch panel or liftgate of a vehicle in a rigid, partially open position, the device having a pair of arms, each arm having a jaw end, a handle end, and a pivotable coupling interconnecting the arms between the jaw end and the handle end for imparting a scissors action. By clamping the jaws of the device around a striker bolt of the vehicle and inserting the opposite end into the lock, the hinged hatch or door is locked in a partially open position, thereby providing a fixed air gap for ventilation and cooling, as is useful when children, pets or groceries are in the vehicle, while preventing the hatch or door from being opened further or shut. In a preferred embodiment, both arms of the device are joined by a pivot pin and are identical, simplifying manufacture.

18 Claims, 6 Drawing Sheets

HATCH LATCH

FIELD OF THE INVENTION

The invention is related to a latch extension device for lockedly securing a hatch panel or liftgate of a vehicle in a partially open position.

BACKGROUND

Hatchbacks, passenger vans, and some sport utility vehicles are equipped with a rear compartment that is accessed via a hatch panel or liftgate which swings open on a hinge. The hatch may be a glass panel. In order to securely park the vehicle, the hatch or liftgate is typically closed and locked using a conventional keyed latch claw and anvil mechanism that engages a U-shaped "striker bolt, also sometimes termed a "staple," mounted on the hatch panel. Lock mechanisms of this type are described by Sarosy in U.S. Pat. No. 4,157,844, as shown in FIG. 1, for example.

However, the rear compartment can overheat if not ventilated. Children, pets or groceries in the vehicle may require ventilation and a useful solution is a latch extension that allows the hatch or liftgate to be secured with a fixed gap for cross-ventilation. The driver may then lock the vehicle with the hatch or liftgate in a partially open but secure position.

For latching a trunk of a car in a partially open position, Gardels in U.S. Pat. No. 2,618,497 described a spacer bar with two modified ends. A variety of very complex single-piece configurations are illustrated that are not easily or inexpensively manufactured. Moreover, none of the options disclosed by Gardels are adapted to modern hatchback closures, which include a "striker bolt" or "staple", typically a U-shaped bolt, and a "latch claw" with spring-operated, reciprocating cam finger for operatively receiving and engaging the striker bolt. The latch claw is generally mechanically coupled to a keyed cylinder for unlocking and releasing the hatch or liftgate, but may include a power lock option.

Rushbaum, in U.S. Pat. No. 4,278,280, describes an adjustable strut for securing the lid of a trunk of a vehicle in a partially open position. However, the device must be clamped at an angle into a particular design of latch in order to lock securely and is not useable with most hatchbacks. Similarly, U.S. Pat. No. 4,667,993 to Hannesson describes a spring-loaded strut that is hooked in place to secure a trunk when carrying a load.

Disadvantageously, the adjustable length of these struts allow an intruder sufficient clearance to gain access to the vehicle.

Also of interest is the latch extender described by Frayne in U.S. Pat. No. 5,165,742, which is adapted for screwing onto a staple of a pivoting window latch assembly and then lockedly inserting via an extension bit into the latching mechanism. However, the bolt, shown as a wing nut, for engaging the device on the staple can be unbolted by an intruder seeking to gain entry to the vehicle and the device has several parts, which can become lost between uses.

Thorlton, in U.S. Pat. No. 5,551,738 describes a one-piece latch extension rod (20) shown in FIG. 2, which consists of a bent rod with two legs and two tang elements (26a,26b) for twistingly engaging a hasp (21) of a hatch window (24) so as to secure the hatch window to an external frame (23) of the vehicle. Opposite the tangs, the bent rod is formed as a striker bar (27), which is inserted into a conventional lock (22) with latching claw and lock anvil. Once pinched in the claw of the latch, the tangs cannot be untwisted to disengage from the staple (21). The tang elements secure the hatch against upward motion but not against downward motion in the staple, so the hatch window for example can be slammed against the tangs, possibly breaking the hatch window panel. The legs are installed with a spring force pinning the tangs (26a,26b) inside the staple (21) in an effort to reduce vertical sliding while in use. The need for spacer rod (25) underlines the problem of unwanted motion. Moreover, one leg (28) is longer in length than the other and is labeled with an identifying band (29) because the device must be inserted into the lock in a particular orientation, a feature that can be easily confusing.

U.S. Pat. No. 6,048,005 to Rotondi describes a hoop-shaped extension striker that is pivotably bolted to the existing vehicle striker of a rear window. Once installed, the device can be unbolted by reaching into the gap under the window and unscrewing the bolts and is not truly secure.

Taken as a whole, the above devices have an assortment of problematic issues which can deter the potential user. Thus there remains a need in the art for a latch extension device that overcomes the above disadvantages, inserts without tools into a conventional lock mechanism, and engages the vehicle's striker bar to form a tight fitting and rigid extension structure that reversibly and lockably secures a hatch or door in a partially open position, thereby providing a fixed gap for ventilation and cooling without jeopardizing personal security.

BRIEF DESCRIPTION OF THE DRAWINGS

The teachings of the present invention can be readily understood by considering the following detailed description in conjunction with the accompanying drawings, in which.

SUMMARY

The latch extension device of the present invention operates to secure a hinged hatchback or liftgate door or window of a vehicle in a partially open but securely locked position, thus realizing in operation a structurally rigid opening or gap for ventilation and cooling without jeopardizing the safety of the vehicle, contents or occupants.

The device comprises a pair of modified arms, the two arms having interlocking jaws on one end, mated opposable handles on the other end, and a pivotable coupling between the jaw ends and the handle ends. The pivotable coupling provides a scissors action to the jaws and handles. The jaw ends are modified each with a crescent-shaped slot for receiving a striker bolt of the vehicle when the jaws are open and for forming a ring-like collar with "annulus" that clampingly engages and retains the striker bolt in its grip when the jaws are closed. When closed, the jaw tips project circumferentially and overlap to interlock and completely enclose the annulus. The handle ends comprise an extension member having a first end joined to the jaw at the pivotable coupling and a second end joined orthogonally by an elbow to a crossbar member. The two handles are flared in the manner of the legs of a U-bolt and the two crossbars are extended crosswise between the legs, each crossbar being generally hemi-cylindrical in cross-section and having an inside flat face. The inside flat faces are configured for apposingly seating against each other when the handle ends are brought together, thereby forming a generally cylindrical transverse "split striker bar" resembling the bridge of a U-bolt when the jaws are closed. The split striker bar is dimensioned to be inserted and clamped in a lock mechanism of a vehicle in place of the striker bolt. A conventional lock mechanism with latch claw and cam finger (also sometimes termed a fork bolt) and lock anvil, such that a conventional striker bolt is caught in a pincer action by the lock, is suitable for clamping the split striker bar of the invention in a locked position. The lock is typically operated with a key and may have a power locking feature as is known in the art.

The latch extension device of the invention has no detachable parts, nuts or bolts, requires no modification of the vehicle or tools for use, is self-aligning during installation, can be readily removed, and easily fits in a pocket or glovebox when not needed. In a first embodiment, the pivotable coupling is formed of an axial pivot hole in each arm and an insertable pivot pin that joins the arms. The two arms rotate with scissors action on the pivot pin so that the jaw ends and handle ends open and close together. In a preferred embodiment, the arms of the pair are essentially identical and may be assembled interchangeably.

By clamping the jaws of the device around a striker bolt of the vehicle and inserting the opposite end into the lock, the hinged hatch or door is locked in a partially open position, thereby providing a fixed air gap for ventilation and cooling, as is useful when children, pets or groceries are in the vehicle, while preventing the hatch or door from being opened further or shut. When locked, the handles form a structurally rigid strut, thereby opening a fixed gap between the hatch panel or liftgate and the vehicle compartment for ventilation and cooling, without jeopardizing personal security.

Notation and Nomenclature

Certain terms throughout the following description and claims are used to refer to particular features, steps or components. As one skilled in the art will appreciate, different persons may refer to the same feature, step or component by different names. This document does not intend to distinguish between components, steps or features that differ in name but not in function or action. The drawing figures are not necessarily to scale. Certain features or components herein may be indicated in somewhat schematic form and some details of conventional elements may not be shown in the interest of clarity and conciseness.

Certain meanings are defined here as intended by the inventor, ie. they are intrinsic meanings Other words and phrases used here take their meaning as consistent with usage as would be apparent to one skilled in the relevant arts.

"Striker bolt"—a part of a mechanical lock that "strikes" a lock anvil, referring most commonly to a U-bolt shaped or bolt-shaped member, also sometimes termed a "staple". "striker" or "hasp", that is affixed to a surface of a vehicle and is configured for engaging a latch claw with cam finger of a lock mechanism. A key is used to release the striker bolt from the lock mechanism in order to open the hatch panel or liftgate of the vehicle. The striker bolt may be positioned on the vehicle frame or on a pivoting surface hinged on the frame, depending on the vehicle make and model.

"Split striker bar"—a part of the mechanism of the invention, comprising a modification of the handles of the device to form bent segments, termed "crossbars", that cross between the handles, orthogonally extending from an elbow at the ends of the handle legs and overlapping each other. The mating surfaces of the crossbeams are formed with an inside flat which, when the handles are closed, are brought into apposition, and form a bipartite structure (herein termed the split striker bar) with the outside dimensions and geometry of a striker bolt. By providing flats on the limbs of the lateral arms, so that the crossbars are generally hemi-cylindrical in cross-section, the bringing together of the crossbars forms a transverse member having the outside dimensions of the striker bolt of the vehicle, which is generally cylindrical in cross-section. The "split" striker bar of the device may be viewed as being split lengthwise so that it can be opened by a scissors action of the handles at the pivot, a motion which also opens the jaws of the device, as will be described further below.

"Conventional"—refers to a term designating that which is known and commonly understood in the technology to which the invention relates.

The terms "including" and "comprising", or variations such as "comprises", are used in an open-ended fashion, and thus should be interpreted to mean, "including, but not limited to . . . ".

A "method" as disclosed herein refers one or more steps or actions for achieving the described end. Unless a specific order of steps or actions is required for proper operation of the embodiment, the order and/or use of specific steps and/or actions may be modified without departing from the scope of the present invention. There is no limit on the time interval over which the steps of the method are performed or by whom.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment and may apply to multiple embodiments. Furthermore, particular features, structures, or characteristics of the invention may be combined in any suitable manner in one or more embodiments.

DETAILED DESCRIPTION

Although the following detailed description contains many specific details for the purposes of illustration, one of skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1A:
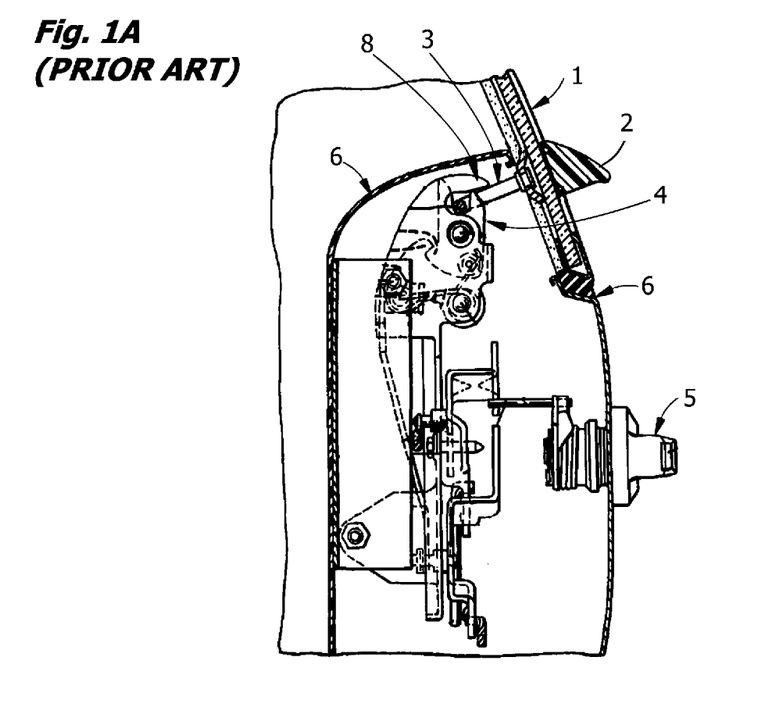
FIGS. 1A and 1B depict a conventional latching mechanism for a hatchback as described by Sarosy in U.S. Pat. No. 4,157,844.
Figure 1B:
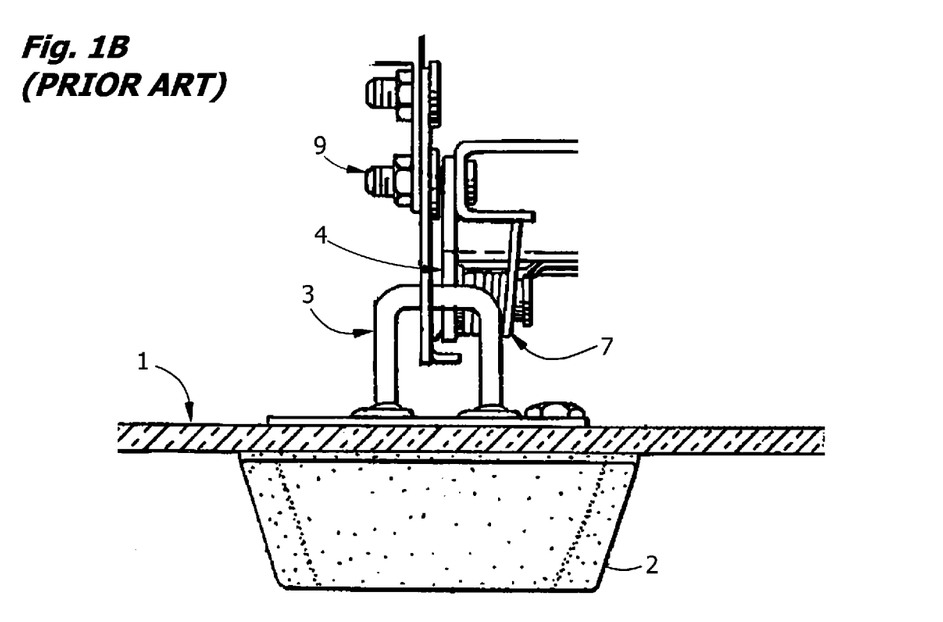

As background, FIGS. 1A and 1B depict a conventional latching mechanism for a hatchback door or window (1) as depicted in U.S. Pat. No. 4,157,844. The latching mechanism consists of a striker or staple, which is the U-shaped bolt (3) shown in FIG. 1B, and a latching claw (4) with rotating cam finger that receives and engages the striker bolt when the hatch (1) is closed. A keyed tumbler assembly (5) frees the mechanism and releases the striker, allowing the door with handle (2) to pivot up and away from the door frame (6) on its hinges (not shown). A mechanical linkage drives the release of the latch claw (4) and rotating cam finger (6) when the key is turned. The latch claw is typically spring-loaded (7), and closes around the striker (3) when the hatch door is closed. Bolt (9) secures the pivotable latch claw to the body of the vehicle.

Figure 2A:
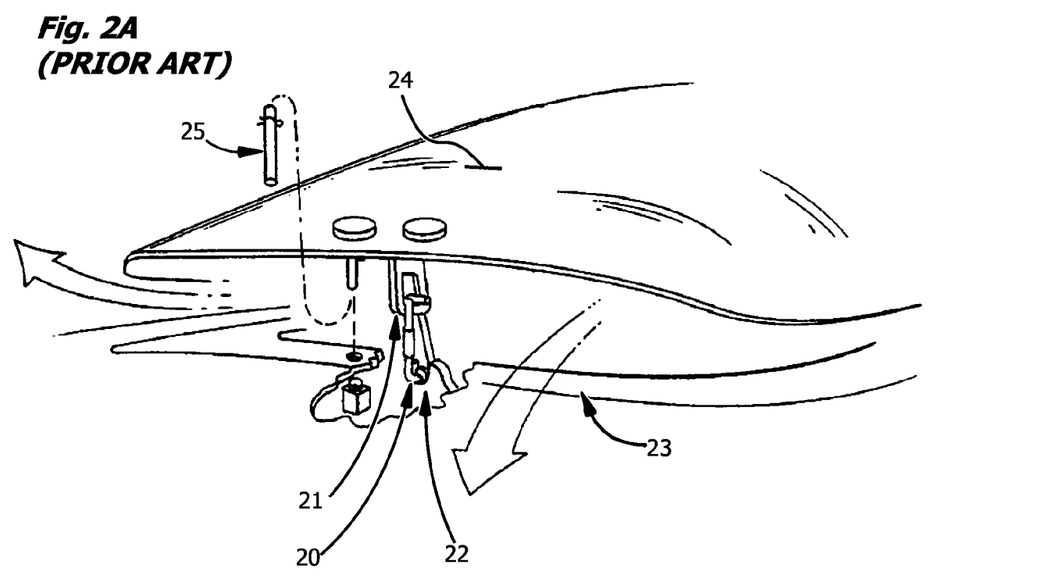
FIGS. 2A and 2B depict a latch extension invented by Thorlton and described in U.S. Pat. No. 5,551,738.
Figure 2B:
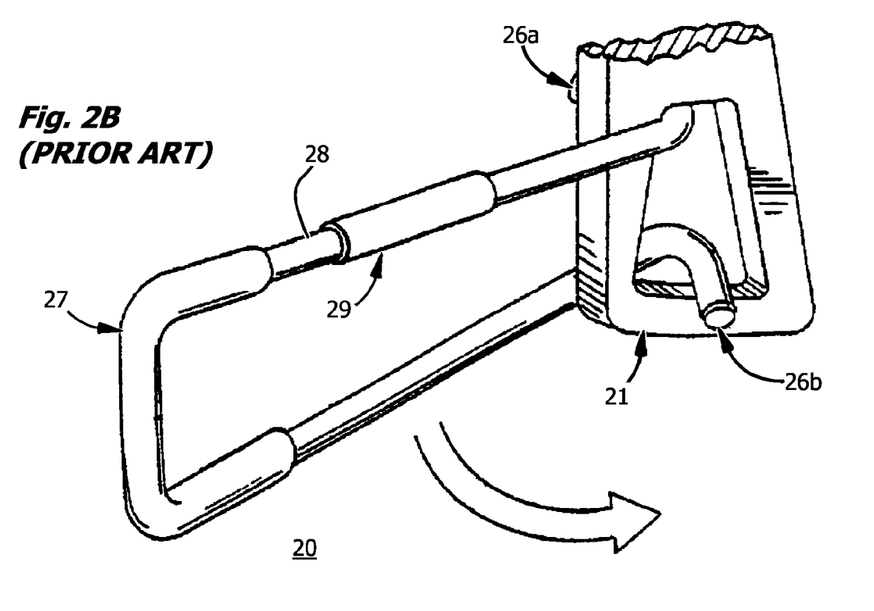

FIGS. 2A and 2B depict a single-piece latch spacer proposed by Thorlton in U.S. Pat. No. 5,551,738. "Tangs" (26a, 26b) of an insertable spacer (20) twistingly engage a hasp (21) or staple mounted on the glass window panel (24), which pivots up to open, and interlocks with the latch mechanism (22) in the vehicle frame (23). Striker (27) of the device engages the lock mechanism of the vehicle. The longer of the legs (28) of the latch spacer piece is banded (29) for identification because the device must be inserted into the hasp in a particular orientation and then twisted (arrow, FIG. 2B) to properly engage the latch claw. The arms are slightly distended in the relaxed position and must be squeezed together to engage the staple. When fully engaged, they are held in place by an outward spring force. However, spacer post (25) is needed to fully stabilize the gap between the window frame (23) and the glass hatch panel (24).

Figures 3A, 3B, 3C:
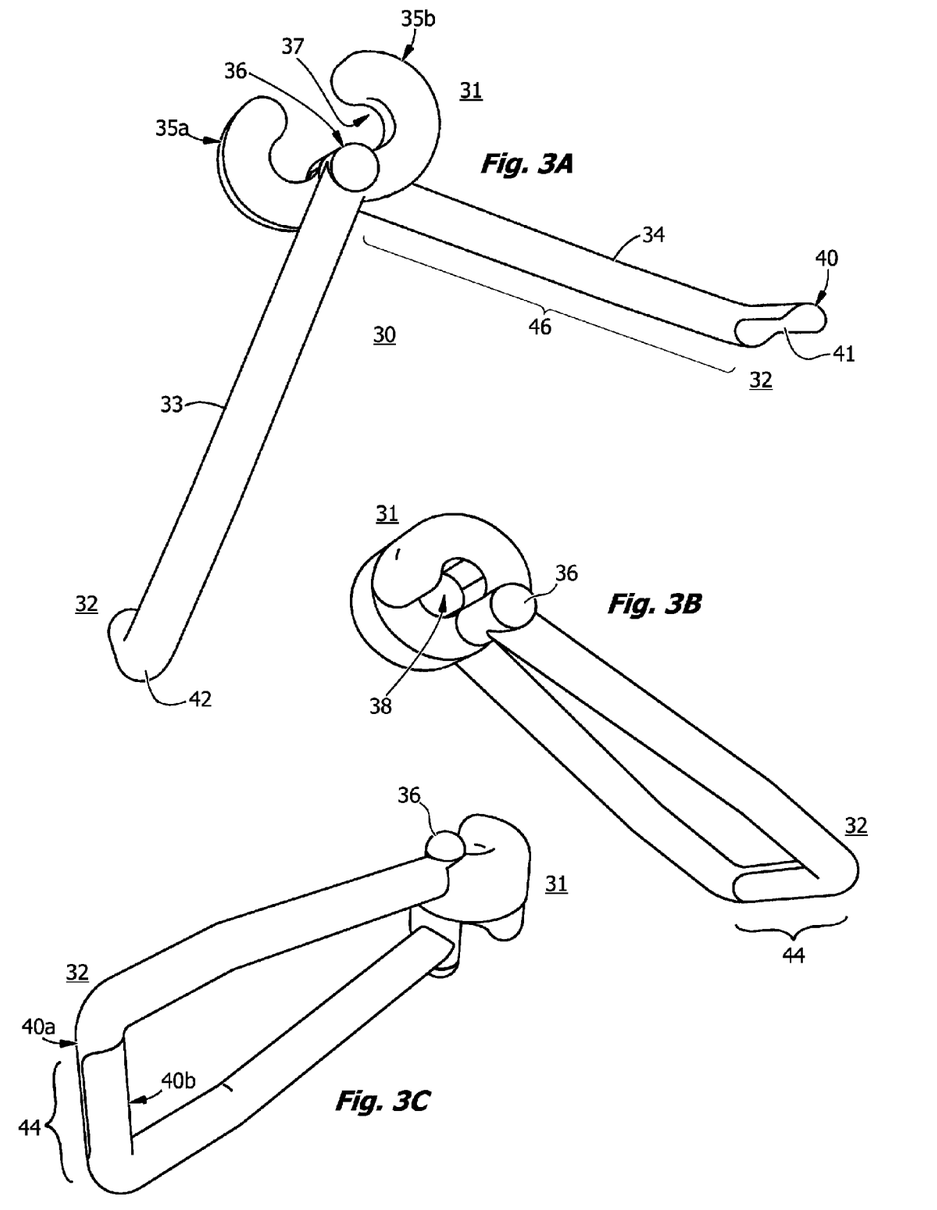
FIGS. 3A through 3C are perspective views of a first embodiment of a latch extension device of the invention.

FIG. 3A is a perspective view of a first embodiment of a device of the invention. The latch spacer or extension device (30) comprises a first arm (33) and a second arm (34), where each arm is joined at a pivotable coupling (36) so that the pair of arms can operate with a scissors motion. The pivotable coupling (36) separates a jaw end (31) with interlocking jaw tips and a handle end (32) with opposable handle ends, where each jaw (35a,35b) of the two arms is configured with an oppositely facing crescent-shaped slot (37) for receiving a striker bar of a vehicle when the jaws are open, and for forming an annular collar with annulus (38, FIG. 3B), when the jaws are closed. The annulus serves to circumferentially clamp and retain the striker bar (not shown, see FIG. 6C) in the grasp of the jaws. The tips of the jaw members project and overlap so as to completely enclose the annulus when closed as shown in FIG. 3B, strengthening the grip and preventing twisting. The handle end (32) comprises a shank or extension member (46) of fixed length projecting from the coupling and ending in a crossbar member (40) orthogonally joined at an elbow (42) to the shank. The crossbar is modified with an inside flat face (41) for apposedly engaging the corresponding inside flat face of the other arm of the pair when the arm handles meet. When the two opposing flat faces of the handles are together, the crossbars are transformed into an inventive "split striker bar" (44, see FIG. 3B).

The convertible split striker bar (44) is shown in perspective in FIGS. 3B and 3C. In operation, the annulus (38) of the jaws is clamped around the true striker bolt of the vehicle, and the convertible split striker bar is inserted into a lock mechanism of the vehicle, where the hemi-cylindrical halves of the split striker bar (40a,40b) are locked so that the jaws around the true striker bolt cannot be opened. By configuring the crossbar limbs and mated flat faces that form the striker bar with a outside cylindrical diameter equivalent to the diameter of the native striker bolt provided with the vehicle, a tight fit is obtained. Similarly, by configuring the annulus (38) of the jaws (35a,35b) with a radius equivalent to the diameter of the striker bolt of the vehicle, a tight fit is obtained when the jaws are closed around the bolt. The device is configured so that the jaws close as the handles meet, and the process is reversible, allowing the user to release the crossbars and the jaws in a simple motion, and then pocket the device for future use.

Figure 4:
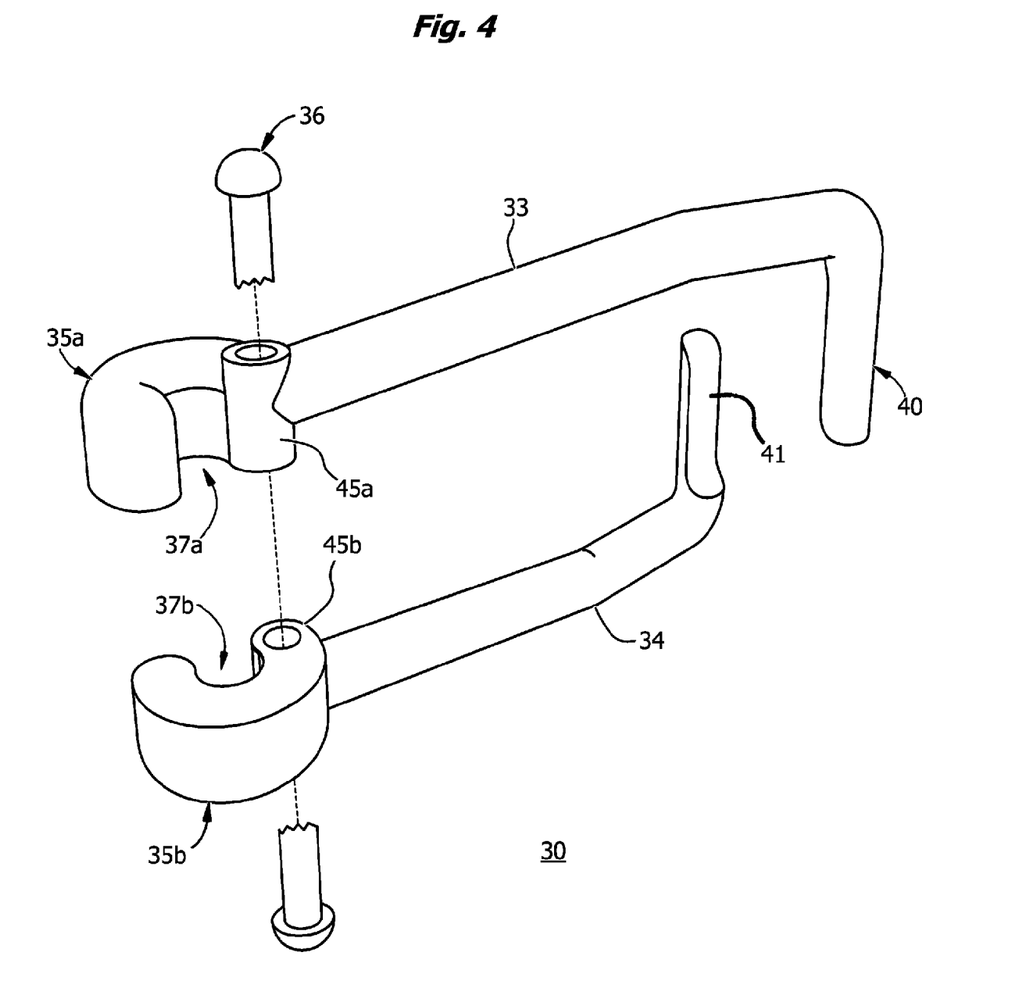
FIG. 4 is an exploded view of an embodiment of the invention.

FIG. 4 is an exploded view of an embodiment of the invention. The device is assembled by orienting the paired jaws (35a,35b) with opposing crescent-shaped slots (37a,37b), and the crossbars (40) with opposing mating inside flats (41); then aligning the pivot holes (45) to form a pivotable coupling between the arms. In this embodiment, a pivot pin (36) is inserted through pivot holes (45a,45b) for joining the first and second arms (33,34). The pivot pin (36) may be a shank pin with mushroom heads as shown, a shoulder rivet, a compound shoulder rivet, a semi-tubular rivet, a male-female screw or rivet, and so forth, that is slip fitted into sleeved pivot holes (45a,45b) during final assembly of the device and generally cannot be disassembled without cutting, sawing, filing or grinding. A bushing may be used if desired. The pivot pin may have a shank section with first radius for engaging a first arm, a second section with second radius for engaging a second arm, and a shoulder or lip between said first section and said second section. The final assembly is a unified, integrated structure, not having parts that may be disassembled thereafter.

In the embodiment of FIG. 4, it can be seen that the long axis of the device has rotational symmetry and may be used in either of two orientations. Serendipitously, no matter which way the jaws are oriented on the staple bolt, the handle end always engages the lock mechanism in the same way. In a preferred embodiment, the two arms are thus identical and interchangeable, thereby simplifying manufacture.

Figure 5A:
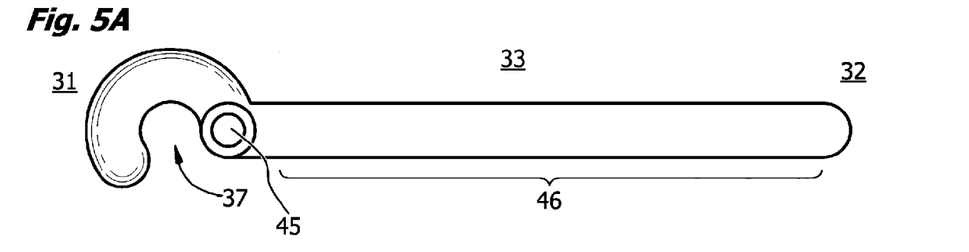
FIGS. 5A and 5B are front and rear views of an arm with jaw end and handle end. In this embodiment, right and left arms are interchangeable.
Figure 5B:
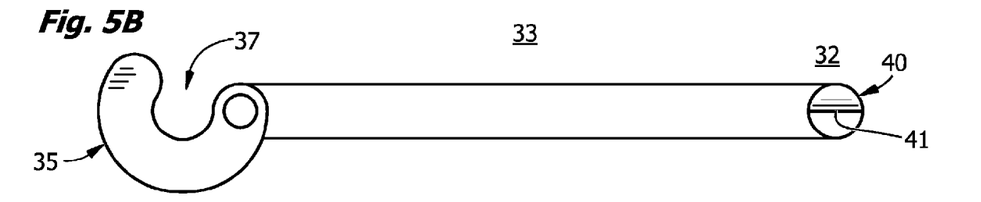

By assembling two each of a single part (33) as shown in FIGS. 5A-G, significant improvements in manufacturability result. FIGS. 5A and 5B are front and rear views of an arm with jaw end (31) and handle end (32). In this embodiment, the first and second arms of the device are identical and interchangeable during assembly. Provision is made for coupling two arms with flush faces (39) juxtaposed for interlocking scissors action, generally at a sleeved pivot hole (45).

Alternatively the arms are not identical and one arm may be supplied with a fulcrum pin or male stud that serves as an axle upon which the second arm is fitted before the stud then capped, for example in a press, with a tolerance so that the two arms can freely pivot. A boss may be used to ensure the pivot coupling turns freely, optionally with mating bushings.

The jaw end (31) is modified to form a rounded nose with crescent-shaped slot (37) opening for receiving the vehicle striker bar. When two jaws are closed, overlapping flats (39, FIG. 5C) of the tips of the jaws form an annular collar enclosing a rounded annulus (38, FIG. 3B) and function to interlock circumferentially around the vehicle striker bar (see FIG. 6C). The first arm presents a jaw (35) with clamping anvil, the second arm presents a jaw with seating anvil, the two jaws work cooperatively to receive and clamp around the split striker bar when scissored from an open to closed position. The circumferentially overlapping and interlocking tips of jaws (35) also prevent twisting after the device is emplaced around the striker bolt.

The handle end (32) is modified to include a crossbar (40) projecting orthogonally from an elbow (42) on the handle arm. The crossbar members are aligned with the center axis of the annulus so that the pivot axis of the jaws and the apposable inside flats (41) of the crossbars are generally parallel, the inside flat faces (41) occupying a plane intersecting the axis of rotation of the arms. As the two ends of the handles are scissored together, the mating flat faces align to appose each other with a generally flush fit, forming the bipartite split striker bar (44). The outside diameter of the split striker bar is generally equal to the dimensions of the striker bolt of the vehicle.

The offset distance between the center axis of the jaw aperture and the transverse axis of the crossbars is proportioned by the length of the extension or spacer member (46)

and defines the effective length of the handle arm, which determines the size of the ventilation gap that will be present between the hatchback and the frame when the latch extension device is in place.

Figure 5C:
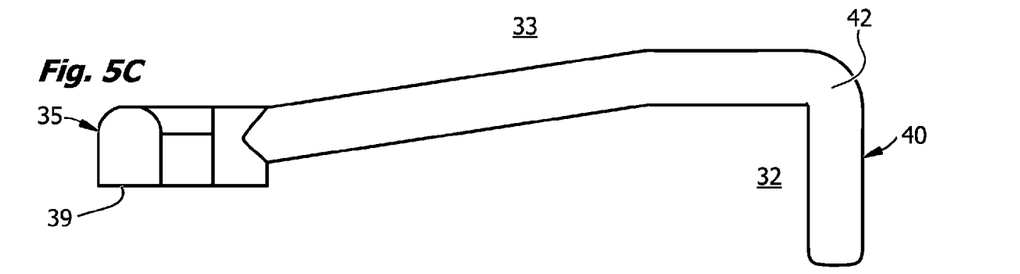
FIGS. 5C-F depict selected views of an individual arm. In a preferred embodiment, the device is composed of two such arms. In end view.
Figure 5D:
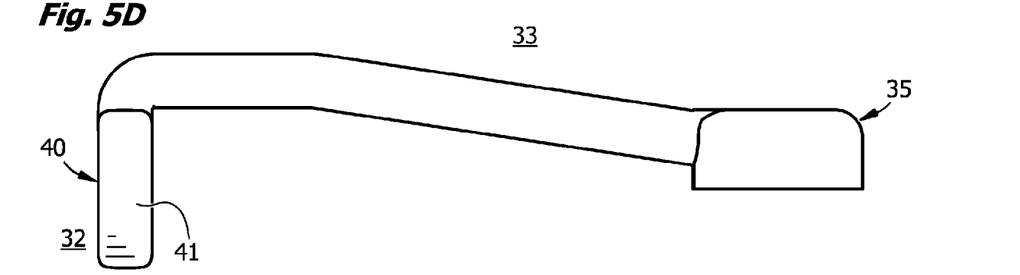
Figures 5E, 5F:
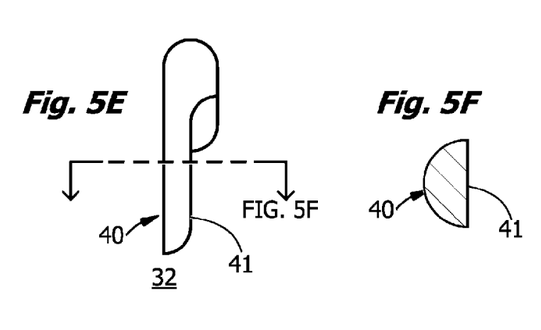
Figure 5G:
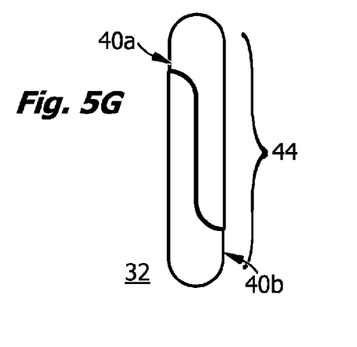
FIG. 5G shows the close apposition of the inside flats of the opposing crossbar members forming the split striker bar.

FIGS. 5C and 5D show elevation views of arm (33), illustrating the elbow (42) at the handle end (32) and orthogonally bent crossbar member (40) with apposable inside flat (41). FIG. 5E is an end view of the handle end (32) and illustrates a preferred configuration with rounded shoulder of the apposable inside flat (41). A cross-section (dotted line in FIG. 5E) through the crossbar (40) is shown in FIG. 5F, illustrating a hemi-cylindrical cross-section with inside flat surface (41). As shown in end view in FIG. 5G, the two inside flats of the crossbars mate with each other when the handles are brought together, thereby surprisingly and synergically transforming themselves into a fully cylindrical "split striker bar" (44) at the handle end. It can be seen that the handles of the device have dual alternating functions for locking and releasing the grip of the jaws on the vehicle striker bolt, serving not only as handles but also as a part of the lock equivalent of a hasp, staple or striker bolt.

As realized in a preferred embodiment, the first arm and the second arm of the pair of arms used to assemble the device of the invention are no different, and are interchangeable during manufacture. However, asymmetrical configurations comprising a conformationally distinct first arm and second arm are also envisaged. For example, a lanyard, clip for a keychain, bell, whistle, or belt loop may be formed on one arm or jaw of a pair, or one shank may be formed with a beveled segment for labeling or stamping identification marks. One arm may include an axle pin and the other arm may include an axle hub as described above, if found to be convenient. And without limitation, the dimensions and general configuration may be selected to render variants of the device compatible with a range of vehicle makes and models.

The parts of the device may be powder coated, anodize or heat treated. In another embodiment, the arms of the device are magnetized, so that the handle ends magnetically interlock when brought together, as is assistive in inserting the device into the locking mechanism of the vehicle. Alternatively, magnetic inserts may be placed in the handle ends.

FIGS. 6A through 6D demonstrate a method of use of a device of the invention. In the first view, the device (30) is shown with handles (32a,32b) widespread and jaws (35a, 35b) scissored open. The jaws are open to accept a striker bolt (62). As illustrated schematically here, the striker bolt is mounted on a glass panel (61) with lip (60), the glass panel having hinges (not shown) opposite the lip for swinging up and down.

Figure 6A:
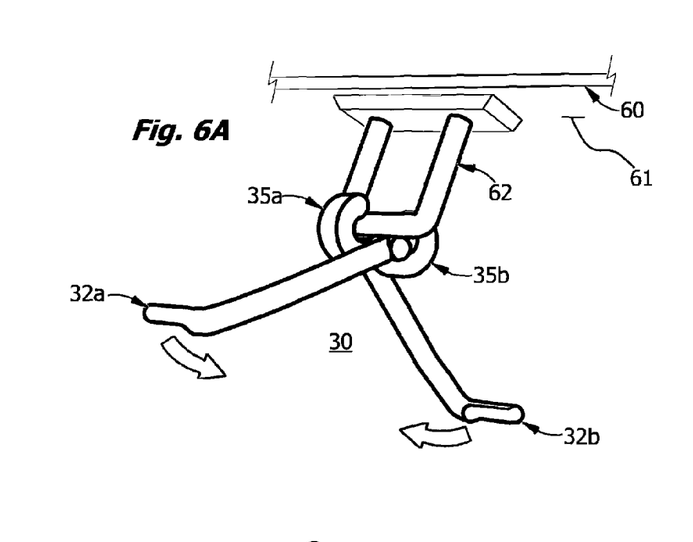
FIGS. 6A through 6D demonstrate a method of use of the device of the invention with a hinged hatch or liftgate door of a vehicle.
Figures 6B, 6D:
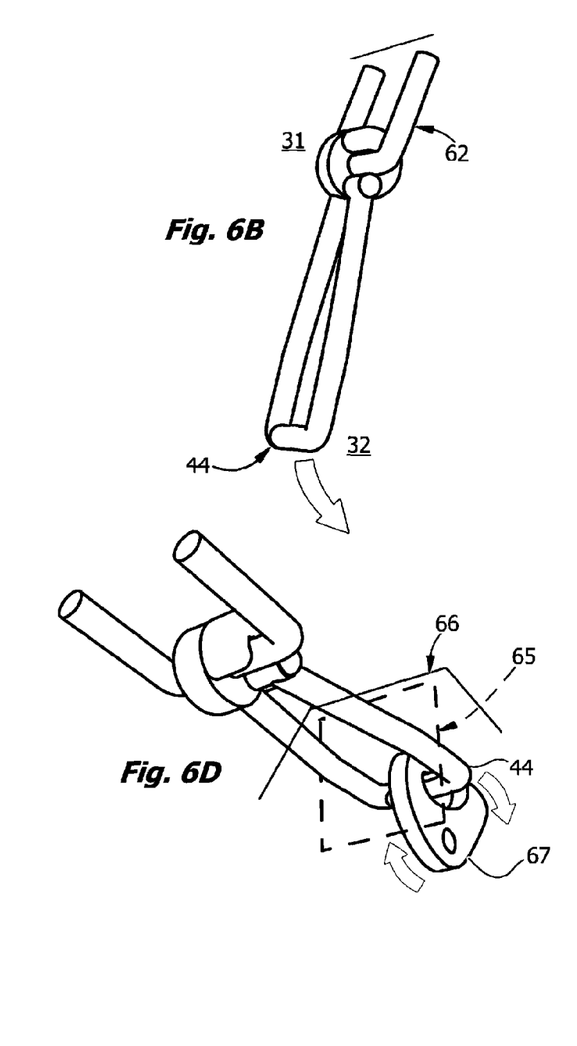

In the second view 6B, the inventive device is shown with handles closed so that the jaw end (31) is locked around the striker bolt (62) of the vehicle. This motion also closes the handle ends (32), bringing the flat faces of the crossbeams into apposition and forming the split striker bar (44), which has a geometry adapted for engaging the cam finger of the latch claw of the vehicle lock, as shown schematically in FIG. 6C.

Figure 6C:
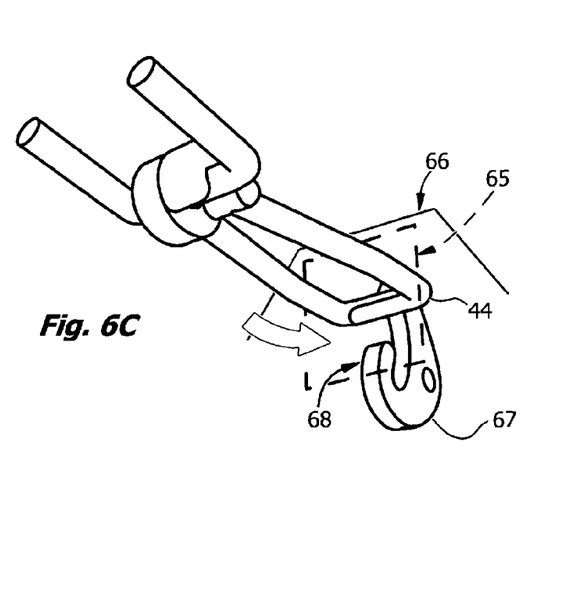

As can be seen here, the split striker bar (44) is inserted into a conventional lock mechanism through port (65) in a lock housing (66) of the vehicle body frame. Locking mechanisms of this type are described in U.S. Pat. No. 6,540,271, for example. The latch claw (67) is configured with a cam finger (68) for engaging the split striker bar (44) of the device, where the mechanism of action of the lock is completely analogous to the conventional action of the cam finger on the striker bolt of the vehicle. The split striker bar substitutes for the striker bolt in engaging the lock. The latch claw is rotatably carried on a shaft mounted inside the lock and is opened through linking rods, pawls or ratchets by a key and handle, generally with a spring bias for closing around the striker member. The rigidity of the latch extension device of the invention ensures that lock mechanism closure is effectively actuated when closing the hatch or liftgate with the latch extension device in place.

Note that in some instances the lock mechanism may be mounted by the vehicle manufacturer in the frame of the vehicle, in other instances may be mounted instead in the door or hatch, and correspondingly the striker bar may be affixed either to the frame of the vehicle or to the hatch or window, but the device of the invention is nonetheless interoperable regardless of the relative position of the components chosen by the vehicle manufacturer. The invention remains operative independent of the particulars of commonly known details of lock mechanisms.

The cam finger (68) is generally part of a bipartite pincer clamping mechanism, which includes an anvil against which the striker bolt of the vehicle is pinned. Analogously, the claw of the lock holds the split striker bar of the inventive device in a grip that allows no motion of the hatch, i.e. when locked the inventive device resists both push and pull on the hatch and has no looseness. It can be seen that the device forms the base of an Isosceles triangle where the three sides of the triangle are 1) the hatch, door or liftgate, 2) the frame on which the moveable piece is hinged, and 3) the latch extension device at the base. All sides being rigid, a triangle is inherently fixed in dimensions and angles by its geometry; the device thus advantageously permits the user to rigidly lock the hatch or liftgate in a partially open position with no give or unsturdiness and no possibility of being opened further. The size of the air gap (i.e., the base of the triangle) is determined by the length of the handles between the jaw annulus and the split striker bar.

Turning to FIG. 6D, the device is illustrated in its locked configuration. Details of the vehicle tailgate frame and locking mechanism are depicted schematically. The latch claw (67) has rotated so that the cam finger engages the split striker bar (44) and secures it against a lock anvil affixed to the body of the vehicle within the receiving port (65) of lock mechanism housing (66).

Thus the invention is also a method for releasably securing a hinged hatch panel or liftgate assembly of a vehicle in a partially open position, the assembly having a striker bolt and a conventional lock mechanism, which comprises supplying a latch extension device of the invention to an owner of a vehicle; wherein the owner performs the following steps with said device for releasably securing said hatch panel or liftgate in a partially open position:
  i) clamping a pair of crescent-shaped jaws of a latch extension device of the invention around the striker bolt;
  ii) inserting the handle end with split striker bar of a device into the lock mechanism until the lock is engaged;
  iii) releasing said split striker bar from said lock mechanism with a key and opening the jaws to detach the device.

Once locked, the device cannot be released unless a key is used to release the latch claw from the split striker bar. The jaws will not open unless the split striker bar is released. Thus the hatch window or door cannot be released or pried open without a key. The action of the device is independent of whether the vehicle lock mechanism is a power lock or a key-operated manual lock and requires no tools or adjustment for installation. The two opposing faces of the split striker bar are self-aligning and the receiving aperture of the jaws is self-assembling around the striker bar. It can be installed with one hand if needed. The device is thus a surprisingly simple and satisfactory solution to the problem of locking a hatch or liftgate in a partially open position, as is oftimes needed to ventilate and cool a parked vehicle while ensuring that the security of the vehicle cannot be breached.

While the device may be used to rigidly secure the hatch in a partially open position when the engine is on and the vehicle is moving, the proximity of the hatch to the exhaust in a conventional vehicle (unlike a truck cab) is likely to have the effect of drawing in exhaust fumes during operation of the vehicle.

Latch extension devices of the invention may be made of a metal or of a plastic. Metal devices may be manufactured by casting, stamping, injection molding, or by bending and machining arts, for example where the flats on the crossbars are formed from barstock by a grinding operation and the jaws are formed by pressing. Machining to form a pivot hole is also useful. Metals suitable for forming the device include steel, iron alloys, aluminum, aluminum alloys, and brass, while not limited thereto. Similar processes may be used to form the device from plastic or reinforced plastic. Plastic arms may be formed by injection molding or by press molding, and the pieces may be cleaned or further refined by machining processes. Suitable plastics include ABS, polypropylene, polyethylene, polycarbonate, polyimide, polyamide, melamine resins, cyclic polyolefins, and other thermoplastics known in the art. Composite graphite- or Kevlar®-reinforced nylon or fiber-reinforced fiberglass polyester are preferred choices for strength. The plastic arms may be joined by a metal pivot pin if desired.

In yet another embodiment of the invention, a set of latch extension devices of the invention is provided as a kit, each device in the set having a distinct arm length ranging from short to long. Optionally, when longer handle arms are used, a cage frame as described in U.S. Pat. No. 4,870,925, but adapted for use with a hatch panel or liftgate, may be supplied to supplement the locking device of the invention.

EXAMPLES

In a first example, a device essentially of FIGS. 3 and 5, a metal cast arm piece was manufactured. Two of the arm pieces were joined together to complete the assembly using a flat-head semi-tubular shoulder rivet. The tips of the jaws extend past the centerline along the handles of the tool, i.e. the jaws occupy about 200-220 degrees of circumference around the crescent slot and hemi-collar so that the two jaws overlap and interlock as a full collar around the striker bolt when the handles are closed. A diameter of the collar annulus of about 0.35 inches was used to fit striker bars of a variety of vehicles. In devices designed to fit particular vehicles, the annulus may be smaller, for example about 0.2, or larger, for example about 0.5 inches. The crossbar joining the handle ends was sized to about 1 inch from side to side to fit a broader variety of vehicles but is not limited thereto. The jaw end had a diameter of about 0.5 inches and the overall length of the device was about 3 inches, conveniently sized to fit in a pocket. Handle lengths can be in a range from 2 to 5 or more inches, depending on the application and on the intended application.

While the above is a complete description of the preferred embodiments of the present invention, various alternatives, modifications and equivalents are possible. These embodiments, alternatives, modifications and equivalents may be combined to provide further embodiments of the present invention. Therefore, in the following claims, the terms used should not be construed or constructed to limit the claims to the specific embodiments disclosed in the specification, but should be construed and constructed to encompass and include all possible embodiments to which such claims are entitled. Accordingly, the claims are not limited by the specifics of the disclosure.

INCORPORATION BY REFERENCE

All of the U.S. patents, U.S. patent application publications, U.S. patent applications, foreign patents, foreign patent applications and non-patent publications referred to in this specification and/or cited in accompanying submissions, are incorporated herein by reference, in their entirety. When cited works are incorporated by reference, any meaning or definition of a word in the reference that conflicts with or narrows the meaning as used here shall be considered idiosyncratic to said reference and shall not supersede the meaning of the word as used in the disclosure herein.

As will be apparent to those skilled in the art and familiar with the instant drawings and written description, significant variations may be made in the details of the illustrated embodiments without departing from the spirit of the invention. Accordingly, the invention is to be broadly construed within the scope of the appended claims.

The invention claimed is:

1. A latch extension apparatus for releasably locking a hinged hatch panel or liftgate of a vehicle in a partially open position, the hatch panel or liftgate of the vehicle having a conventional lock mechanism with a striker bolt and latch claw, the latch extension apparatus comprising a) a first arm and a second arm forming a pair of arms, said pair of arms having jaws at a jaw end, and opposable handles at a handle end;

b) a pivotable coupling joining said arms between said jaw end and said handle end, said pivotable coupling enabling a scissors action of said arms between an open position and a closed position defined thereby;

wherein each of said arms is configured with a jaw member having a crescent-shaped jaw tip that defines a striker bolt-receiving slot therein, said jaw member of said first arm cooperatively engaging said jaw member of said second arm so as to enable receiving the striker bolt of the vehicle lock in said slots in the open position, and, forming an annular collar with annulus defined by said surrounding jaw tips in the closed position, the annular collar for circumferentially engaging and retaining the striker bolt of the vehicle lock in said annulus;

said opposable handles each comprise a first end joined to said jaw member at said pivotable coupling, an extension member and a second end terminating in a crossbar joined orthogonally to said extension member at an elbow, said crossbar being generally hemi-cylindrical in cross-section substantially along its length and having a generally flat inside face such that said flat inside faces of said crossbars of said opposable handles apposingly seat against each other and form a split striker bar when the second ends are brought together in the closed position, said split striker bar being substantially cylindrical in cross-section along its length and having dimensions to be inserted and clamped to the latch claw of the vehicle by a pivoting motion of the latch extension apparatus on said striker bolt, wherein said motion is contained in a single plane; and further wherein said jaw ends and said handle ends cooperate so that:

i) in said closed position, said jaw end is configured to enclose the striker bolt of the vehicle and said handle end is configured to form said split striker bar for insertion into and locking in the lock mechanism of the vehicle, and ii) in said open position, as by releasing the split striker bar from the lock mechanism of the vehicle with a key, the apparatus may be disengaged from the vehicle by the opening of the jaws cooperatively with the handles.

2. The apparatus of claim 1, wherein said annular collar is configured with inside dimensions corresponding to the outside dimensions of said striker boltof the vehicle, thereby tightly clamping said striker bolt therein.

3. The apparatus of claim 1, wherein said split striker bar is configured with outside dimensions for insertion between a latch claw with cam finger and a lock anvil of the lock mechanism of the vehicle, the lock mechanism for tightly clamping said split striker bar therein.

4. The apparatus of claim 1, wherein said first arm and said second arm have the same shape.

5. The apparatus of claim 1, wherein said pivotable coupling is formed of a pivot hole in each arm and a pivot pin inserted therethrough, said pivot pin forming an axis of pivot.

6. The apparatus of claim 5, wherein said pivot pin is a shoulder rivet, a compound shoulder rivet, a semi-tubular rivet, a male-female screw or a male-female rivet.

7. The apparatus of claim 1, wherein said pair of arms forms the base of an Isosceles triangle when lockedly engaged as a rigid strut between the striker bolt and the lock mechanism of the vehicle, said base of said Isosceles triangle having a length proportioned by the length of said extension member, and further wherein said Isosceles triangle has an apex at a hinge for mounting said hatch panel or liftgate to said vehicle, said pair of arms thereby rigidly holding said hatch or liftgate in a partially open position until released by the key.

8. A set of two or more apparatuses of claim 7, wherein each apparatus of said set is distinguished by a different length of said pair of arms.

9. The apparatus of claim 1, wherein the apparatus is formed of a metal or a plastic.

10. The apparatus of claim 1, wherein the apparatus is formed of an aluminum, an iron, a brass, a steel, or an alloy thereof.

11. The apparatus of claim 10, wherein the apparatus is formed by casting, machining, stamping or injection molding, and is optionally heat treated, anodized or powder coated.

12. The apparatus of claim 10, wherein said iron or steel, or an alloy thereof, is magnetized so that the handle ends magnetically interlock when brought together.

13. The apparatus of claim 1, wherein said apparatus is self-aligning in use, is engaged and disengaged for its intended purpose without the use of tools, and is tamperproof by virtue of its integrated structure, not having parts that can be disassembled without cutting, sawing, filing or grinding.

14. The apparatus of claim 1, wherein said pivotable coupling is formed from a male pivot stud projecting from said first arm and a stud-receiving female pivot hole of said second arm, said male pivot stud forming an axis of pivot.

15. The apparatus of claim 1, wherein said pivotable coupling comprises a leaf or coil spring for biasing said pair of arms in an open or closed position.

16. A method for releasably securing a hinged hatch panel or liftgate of a vehicle in a partially open position, the hatch panel or liftgate having a conventional lock mechanism with striker bolt: which comprises a) supplying a latch extension apparatus, said latch extension apparatus having a pair of arms with a first arm and a second arm, said pair of arms having a pair of crescent-shaped jaws with circumferentially overlapping interlockable jaw tips at a jaw end, opposable handles at a handle end, and a pivotable coupling between said jaw end and said handle end, said pivotable coupling for interconnecting said first arm and said second arm and for enabling a scissors action of said arms in, each handle of said handle end comprising an extension member with a first end joined at said pivotable coupling to said jaws and a second end joined orthogonally by an elbow to a crossbar, each crossbar being generally hemicylindrical in cross section substantially along its length and having a generally flat inside face, wherein said crossbars are configured for spanning crosswise between the second ends of said extension members and said flat inside faces are configured for apposingly seating against each other when the handles are brought together in a closed position of the jaws, thereby forming a split striker bar, said split striker bar being generally cylindrical in cross-section and configured to be inserted and clamped in said lock mechanism in place of said striker bolt;

b) clamping said pair of jaws around said striker bolt of said vehicle;

c) hingedly rotating said split striker on said striker bolt, wherein said motion is contained in a single plane, and lockingly inserting said split striker bar of said handle end into said lock mechanism until the lock mechanism is engaged; and d) releasing said split striker bar from said lock mechanism with a key and opening said jaws to detach the apparatus.

17. The method of claim 16, wherein said apparatus is sized to be carried in a pocket, stashed in a glove box, or clipped to a keychain.

18. The method of claim 16, wherein said handles magnetically interlock when brought together for ease of insertion into said lock mechanism.

* * * * *